(12) United States Patent
Perkins et al.

(10) Patent No.: US 7,961,157 B2
(45) Date of Patent: Jun. 14, 2011

(54) CONFIGURABLE IMAGING SYSTEM

(75) Inventors: Michael Perkins, Kitchener (CA);
Robert Rushby, Cambridge (CA)

(73) Assignee: Christie Digital Systems USA, Inc.,
Cypress, CA (US)

( * ) Notice: Subject to any disclaimer, the term of this patent is extended or adjusted under 35 U.S.C. 154(b) by 825 days.

(21) Appl. No.: 11/748,255

(22) Filed: May 14, 2007

(65) Prior Publication Data

US 2008/0284675 A1    Nov. 20, 2008

(51) Int. Cl.
*G09G 5/00* (2006.01)
(52) U.S. Cl. ........................................................ 345/1.3
(58) Field of Classification Search ............ 345/1.1–3.4
See application file for complete search history.

(56) References Cited

U.S. PATENT DOCUMENTS

| | | | |
|---|---|---|---|
| 4,974,073 A | 11/1990 | Inova | |
| 5,136,390 A | 8/1992 | Inova | |
| 5,767,818 A * | 6/1998 | Nishida | 345/1.1 |
| 6,081,375 A | 6/2000 | Furuya et al. | |
| 6,115,022 A | 9/2000 | Mayer, III et al. | |
| 6,219,011 B1 | 4/2001 | Aloni et al. | |
| 6,335,829 B1 | 1/2002 | Van De Voorde | |
| 6,501,441 B1 | 12/2002 | Ludtke et al. | |
| 6,550,521 B1 | 4/2003 | McNabb | |
| 6,760,075 B2 | 7/2004 | Mayer, III et al. | |
| 6,771,307 B2 * | 8/2004 | Waki et al. | 348/189 |
| 6,791,513 B2 * | 9/2004 | Ogino et al. | 345/55 |
| 6,799,836 B2 | 10/2004 | Silverbrook | |
| 6,956,541 B2 * | 10/2005 | McClintock | 345/1.1 |
| 7,248,229 B2 * | 7/2007 | Zerphy et al. | 345/1.3 |
| 2001/0026326 A1 | 10/2001 | Itaki et al. | |
| 2005/0018040 A1 | 1/2005 | Buchner et al. | |
| 2005/0219467 A1 | 10/2005 | Nomizo et al. | |

FOREIGN PATENT DOCUMENTS

| | | |
|---|---|---|
| DE | 4006189 | 9/1991 |
| JP | 8-88820 | 4/1996 |
| JP | 2000-276099 | 10/2000 |
| JP | 2002-162689 | 6/2002 |
| WO | 99/13377 | 3/1999 |
| WO | 99/29117 | 6/1999 |
| WO | WO 00/18138 | 3/2000 |
| WO | WO 00/18139 | 3/2000 |
| WO | WO 2006/115852 | 11/2006 |

OTHER PUBLICATIONS

European Search Report mailed Oct. 26, 2009 in corresponding European Patent Application 09009079.6.
Ezekiel S. Bhasker, et al., "Asynchronous Distributed Calibration for Scalable and Reconfigurable Multi-Projector Displays", IEEE Transactions on Visualization and Computer Graphics, IEEE Service Center, Los Alamitos, CA, vol. 12, No. 5, Sep. 1, 2006, pp. 1101-1108.
European Search Report issued on Oct. 20, 2008 in corresponding European Patent Application No. 08 25 1680.

(Continued)

*Primary Examiner* — Stephen G Sherman
(74) *Attorney, Agent, or Firm* — Staas & Halsey LLP

(57) ABSTRACT

An imaging system, comprising an image source and a plurality of microtile units for generating respective portions of an image, each microtile unit including a plurality of coupling mechanisms for connection to a plurality of other microtile units such that the microtile units may be arranged in multiple geometrical configurations, and each microtile unit including circuitry for communication with the other microtile units to control generation of each respective portion of the image.

20 Claims, 6 Drawing Sheets

OTHER PUBLICATIONS

U.S. Appl. No. 11/748,255, filed May 14, 2007, Michael Perkins, Christie Digital Systems USA, Inc.
U.S. Appl. No. 12/183,653, filed Jul. 31, 2008, Michael Perkins, Christie Digital Systems USA, Inc.
U.S. Notice of Allowance mailed Oct. 19, 2010 in corresponding U.S. Appl. No. 11/748,255.
U.S. Notice of Allowance mailed Nov. 19, 2010 in corresponding U.S. Appl. No. 12/183,653.
U.S. Office Action mailed Sep. 29, 2010 in corresponding U.S. Appl. No. 12/183,653.
U.S. Office Action mailed May 26, 2010 in corresponding U.S. Appl. No. 11/748,255.
U.S. Restriction Requirement mailed Mar. 23, 2010 in corresponding U.S. Appl. No. 11/748,255.

* cited by examiner

CONFIGURABLE IMAGING SYSTEM

BACKGROUND

1. Field

The following is directed in general to imaging systems, and more particularly to an imaging system having a plurality of microtile units for generating respective portions of a composite image.

2. Description of the Related Art

A large number of applications and potential applications exist for imaging systems such as projection displays that are used to display information. Such applications include, but are not limited to, general indoor signage (e.g. shopping malls, arcades, etc.), transportation signage (e.g. arrival/departure times, etc.), in-lobby signage for office buildings, control rooms, restaurants signage, etc.

The currently prevailing paradigm in the projection display industry is that improvement must be based on higher light power (lumens) at higher resolutions and progressively lower cost. This paradigm is based on the concept that higher resolution and higher power are necessary to develop larger displays with acceptable image quality and brightness using a least number of projectors. This paradigm has served the industry well, but has a number of drawbacks which include: the significant cost associated with higher resolutions, limitations in projector resolution due to light valve/panel design, increased weight, increased cost and increased noise levels associated with cooling systems necessary to accommodate high power illumination.

Moreover, the currently prevailing paradigm is based on static size and configuration of displays. Thus, whereas it is known to provide large displays by assembling a multiplicity of small displays in an array (see, for example, WO 2006/115852 (Ostendo)), there is no provision for creating customized shapes and dimensions of display from such multiple small displays.

SUMMARY

According to an aspect of this specification, an imaging system is set forth having a plurality of small projection devices (referred to herein as 'microtile' units) for generating respective portions of a composite image. Each microtile unit includes coupling mechanisms for connection to at least one other microtile unit such that the microtile units may be arranged in multiple geometrical configurations of various sizes. In another aspect, the microtile units include functionality to 'self-organize' the distribution of control signals and content over arrays of microtile units of arbitrary shape and size. The term "array" is used broadly in this specification to mean any arrangement of interconnected microtile units, and is not limited to a rectangular configuration of plural microtile units.

The imaging system set forth herein below establishes a new paradigm wherein improvement in brightness is achieved without increased power requirements (e.g. the increase is in the order of nits rather than lumens), at a required pixel pitch (pixels per mm) rather than increased resolution, and at very low cost.

The imaging system set forth herein results in a new paradigm that uses low resolution (inexpensive) panels with low power illumination in order to achieve very low cost projection displays. The microtile units set forth herein are reusable and configurable to enable low cost displays of almost any size and shape, without sacrificing image quality and brightness.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings, in which:

FIG. 4 depicts grid microtile units according to a second embodiment of the invention, wherein

DETAILED DESCRIPTION OF THE EMBODIMENTS

Figure 1:
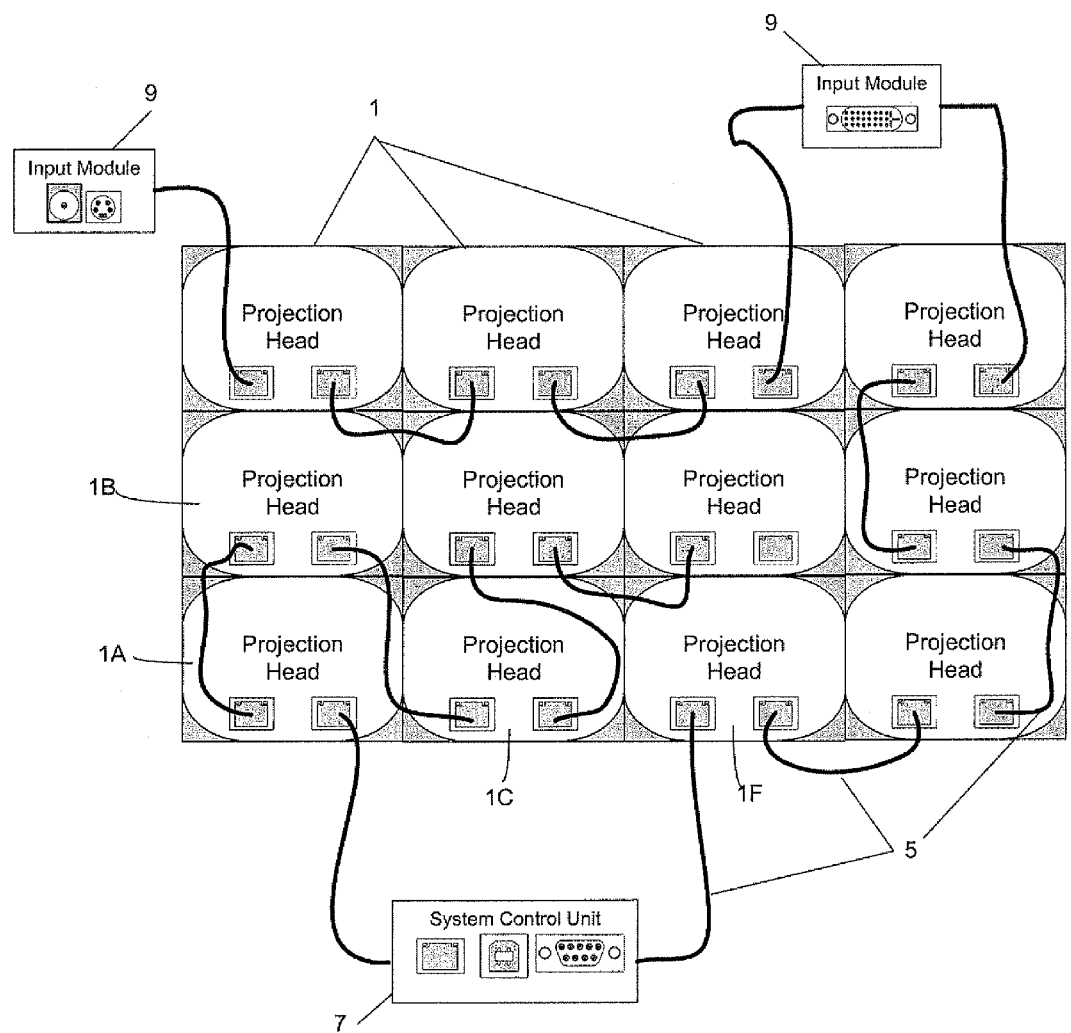
FIG. 1 is a block diagram of an exemplary imaging system comprising a plurality of microtile units, according one embodiment of the invention.

In FIG. 1, an exemplary imaging system is shown comprising a plurality of series connected microtile units or projection heads 1 assembled to form an array. Cables 5 are used to connect the microtile units 1 in any sequence. According to one embodiment standard CAT 5 cabling is used having four twisted wire pairs for data and command message transmission, wherein command messages are embedded in the blanking interval of a video data stream. Data transmission preferably occurs at a rate of about 5 Gpbs.

Each microtile unit 1 contains a light engine and circuitry (including, for example, a microprocessor, RAM frame buffer and video processing to provide image capture, resizing, color matching, edge blending, etc.), discussed in greater detail below with reference to FIGS. 7 and 8. Data received from an adjacent microtile unit 1 via cable 5 is buffered and retransmitted to the next series-connected microtile unit 1 (or system control unit 7 or input module 9). The video processing circuitry preferably includes modules for sub-image capture and resizing, color matching, edge blending, uniformity correction and 2D keystoning. Also, as discussed in greater detail below with reference to FIGS. 6A and 6B, color, brightness and image uniformity may be achieved using intelligent self-alignment of images between microtile units 1 and intelligent brightness and color control.

At least one system control and power unit 7 is connected to an available port on one of the microtile units 1 for providing power (e.g. 48 V DC) and to facilitate automatic detection of the configuration of interconnected microtile units 1, as described in greater detail below. Typically, the system control and power unit 7 includes at least one Ethernet, USB and/or infrared port to a user interface (not shown), and generates full frame static images (i.e. transfer image content from a SD (Secure Digital) flash card to a frame buffer for display), as well as implementing OSD (on-screen display) overlays (OSD allows the user to view and change display settings on-screen).

At least one input unit 9 is also connected to an available port on one of the microtile units 1 for providing a video and/or image source for display by the microtile units 1. Preferably, the input unit 9 performs video processing, such as de-interlacing, scaling, frame rate conversion, etc.

Each microtile unit 1 requires electronic communication only with adjacent microtile units (or input unit(s) 9 or the system control unit 7, any of which can be connected anywhere in the chain of series-connected microtile units 1), provided that an electronic signal path from the system control and power unit 7 and input units 9 extends via respective microtile units 1 and associated cables 5 to each microtile unit 1.

As discussed in greater detail below, with reference to FIGS. 2 and 3, a variety of different mechanical coupling mechanisms are possible for achieving accurate alignment of each microtile unit 1 with respect to its adjacent interconnected microtile units 1.

Figure 2:
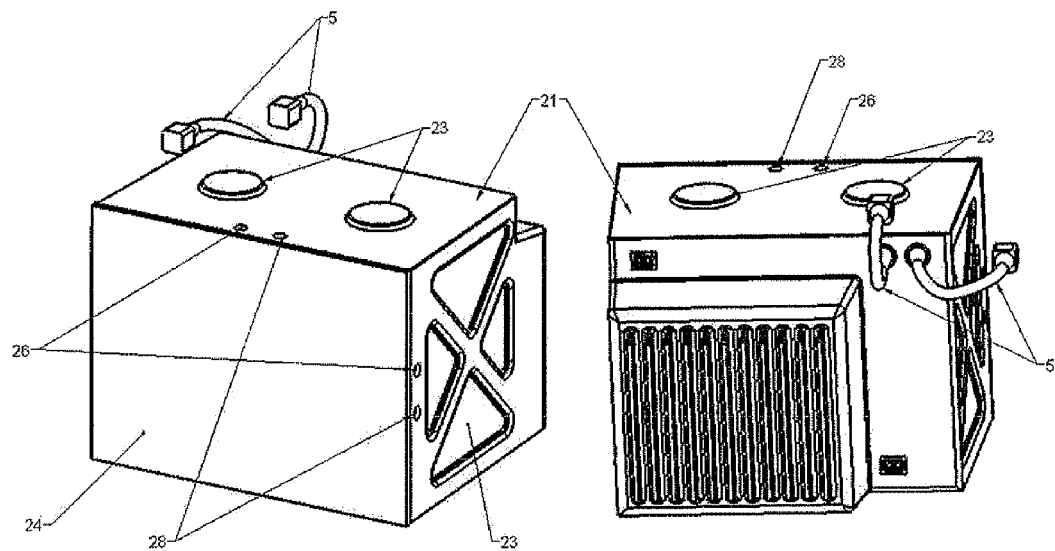
FIG. 2 depicts front and rear perspective views of a pair of block microtile units.

According to one embodiment, the microtile units are in the form of "block" microtile units 21, as shown in FIG. 2. Coupling mechanisms 23 permit registration or alignment of a microtile unit 21 with other microtile units based on the shapes of protrusions on respective side surfaces of each microtile unit. The front surface of each microtile unit 21 comprises a self-contained screen 24. A small rear projector (including light source, light valve, optics and associated electronics) is provided within each microtile unit 21 for projecting an image on screen 24. According to an exemplary embodiment, the light source is implemented using LEDs, although it is contemplated that lasers or other light sources may be utilized, the selection and implementation of which would be known to a person of ordinary skill in the art.

A pair of LEDs 26 and Photodetectors 28 is provided on each of the top, bottom, left and right surfaces, to permit of self-organizing and configuring of the microtile units 1, as discussed in greater detail below.

Figure 3A:
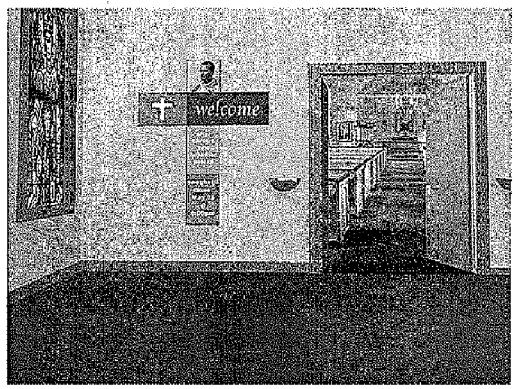
FIGS. 3A and 3B depict exemplary configurations of microtile units to create a composite image.
Figure 3B:
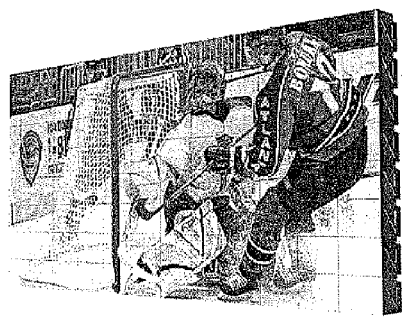

Also discussed in greater detail below, each microtile unit 21 projects a portion of a composite image (preferably at SVGA resolution to enable small pixel pitch (under 1 mm)), as shown in FIGS. 3A and 3B. It will be noted that microtile units 21 are not required to be arranged in rectangular configurations, thereby resulting in significant flexibility in terms of display design (FIG. 3A).

According to a successful prototype, each block microtile 21 has a diagonal dimension of approximately 400 mm for projecting an image having a 4:3 aspect ratio, although other dimensions and aspect ratios are contemplated. However, a person skilled in the art will appreciate that a range of display sizes and shapes may be accommodated. For an indoor display, such as shown in FIG. 3A, it is contemplated that 500 nits of brightness will be sufficient, although other brightness may be provided depending on the illumination source, optical design and screen size.

Figure 4A:
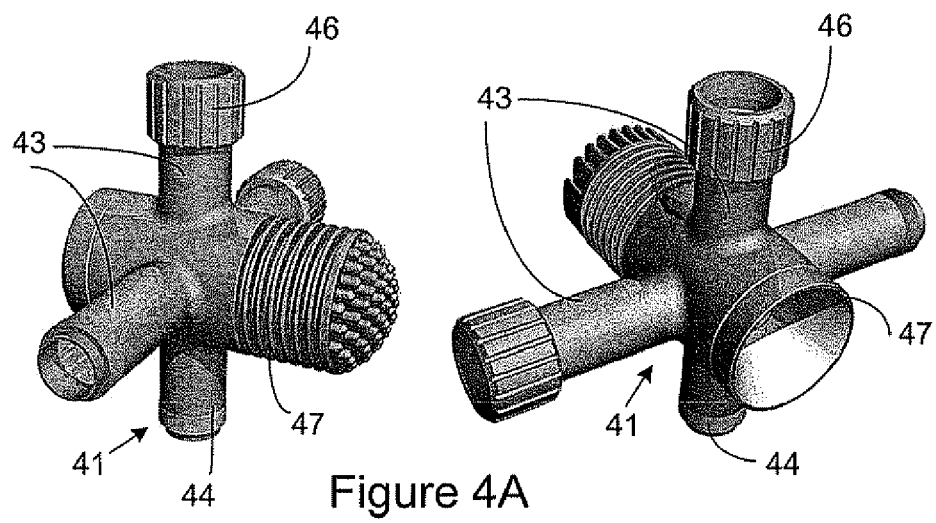
FIG. 4A shows front and rear views of a grid microtile unit.
Figure 4B:
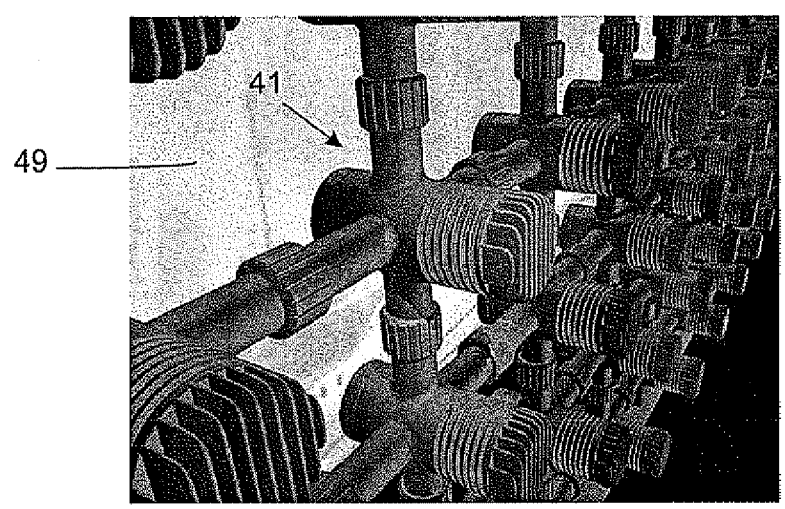
FIG. 4B shows an array of grid microtile units for displaying a composite image on the rear of a display screen.
Figure 4C:
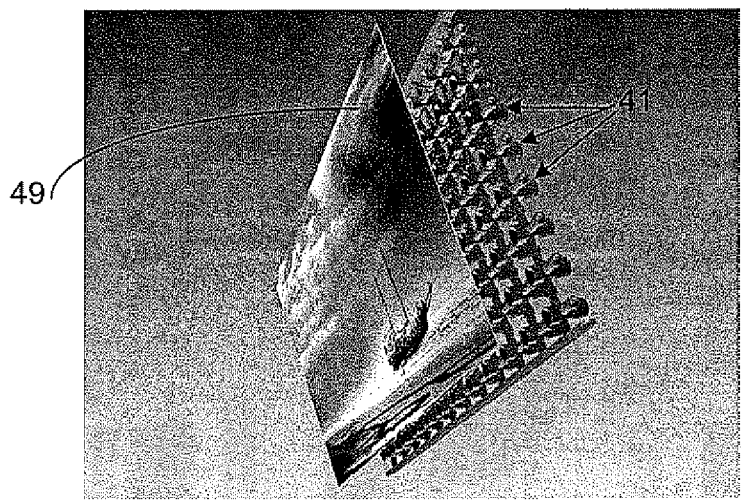
FIG. 4C is a front view of the array and screen of FIG. 4B

Turning to FIG. 4A, an embodiment of a "grid" microtile unit 41 is set forth capable of connection with other grid microtile units as shown in FIGS. 4B and 4C. The grid microtile units 41 are similar in functionality to the block microtile units 21 of FIG. 2. However, there is no self-contained screen in the grid microtile unit 41. Tubular coupling mechanisms 43 permit interconnection between adjacent microtile units 41 via complementary threaded male portions 44 and female coupling sleeves 46. A small rear projector 47 (including light source, light valve, optics and associated electronics) is provided within each microtile unit 41 for projecting an image onto a remote screen (such as screen 49 depicted in FIGS. 4B and 4C). As discussed above, each microtile unit 41 projects a portion of a composite image onto the remote screen 49. FIGS. 4B and 4C show an array of interconnected grid microtiles 41 projecting an image onto screen 49 (wherein FIG. 4B is a view showing projection onto the rear surface of the screen whereas FIG. 4C shows the image as displayed on the front surface of the screen).

Figure 5:
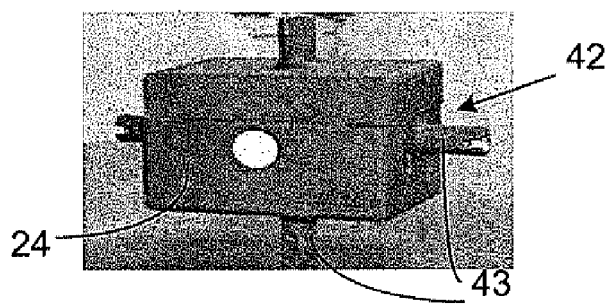
FIG. 5 shows an alternative embodiment of grid microtile unit.

FIG. 5 shows yet a further alternative embodiment of microtile unit 42 which is in the shape of a block incorporating a light engine and circuitry and a front surface comprising a self-contained screen 24 like the block microtile units 21, but which includes tubular coupling mechanisms 43, as in the grid microtile embodiment of FIG. 4. Numerous other configurations may also be adopted.

As discussed briefly above, self-alignment of images across successive adjacent microtile units may be accomplished by electronic adjustment of the image upwardly, downwardly, right, left, via roll, pitch and yaw. This dramatically reduces or eliminates the need for expensive mechanical adjustments and provides for simple correction of zoom errors.

Figure 6A:
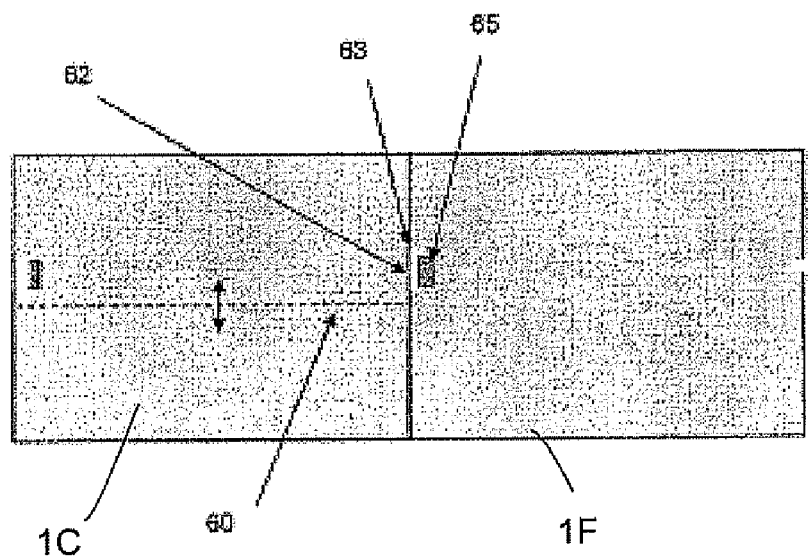
FIGS. 6A and 6B are front and perspective views, respectively, showing a feature of the block microtile unit for effecting self-alignment of images across successive adjacent microtile units.
Figure 6B:
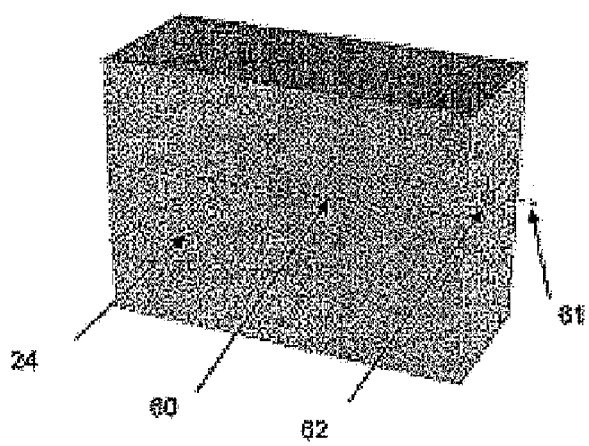

One such alignment process (for use with block microtile units 21) requires slightly over-scanning the screen 24 so that a small portion of the edge of each image (e.g. line 60) spills over onto a side wall of the microtile unit, as shown in FIGS. 6A and 6B, such that light spills (e.g. at 61) through a pinhole 62 therein, and is detected by a sensor 63 disposed in a small opening 65 in the adjacent screen. By controlling the image content in the overspill area, the sensor 63 detects when the image is aligned properly. Using several of these pinhole/sensor pairs, keystoning can be sensed and adjusted for. By sensing the color intensity of the light spilling through the pinhole 62, the system can automatically adjust for consistent intensity and colour. Alternatively, it is contemplated that the sensors may be placed in the same cabinet as the projection system and only self-align within the block itself.

Another alignment process (for use with grid microtile units), requires overlapping the image portions projected by successive microtile units onto the screen 49, and using known edge blend techniques to eliminate perceived borders between the image portions. Examples of such edge blend techniques are described in U.S. Pat. No. 4,974,073 entitled "Seamless Video Display"; U.S. Pat. No. 5,136,390 entitled "Adjustable Multiple Image Display Smoothing Method and Apparatus"; U.S. Pat. No. 6,115,022 entitled "Method and Apparatus for Adjusting Multiple Projected Raster Images" and U.S. Pat. No. 6,760,075 entitled "Method and Apparatus for Seamless Integration of Multiple Video Projectors".

Image uniformity may be achieved through careful optical design and through electronic image adjustment, as well as through screen design (with careful consideration to viewing angles, contrast and related issues). Careful consideration of these factors is important to achieving a pleasing multi-tiled display while avoiding 'hot-spots', minimizing reflections from ambient light and unpleasant screen-to screen-variation. 'Optical' screen designs may be used to achieve this (i.e. a single element or multiple element rear-projection screen that is designed to achieve a predefined optical function, for example: to control the light path as to enhance the quality of the display images for optimum viewing conditions).

According to an important aspect of the invention, the array of microtile units 1 self-organizes based on the number and configuration of the microtile units. One exemplary method of self-organizing and configuring is implemented under control of the system control unit 7, although it is contemplated that self-organizing and configuring may also be performed as a distributed process among the interconnected microtile units 1.

The exemplary method of self-organizing and configuring of microtile units 1 comprises three phases: Address Assignment; Module Identification; and Array Mapping. Once these three phases are complete, the system controller unit 7 contains a complete map of the interconnected microtile units 1 for the purpose of distributing control signals and image content over the entire array in accordance with the detected shape and size of the array. The system control unit 7 initiates the self organization process as part of the power-up procedure. Preferably, the input modules 9 and microtiles units 1 support hot plugging, so that a user interface option may be provided to rerun the self organization process on an as-required basis.

In the Address Assignment step, the system control unit 7 issues an "AUTOADDRESS 1" command to the first 'leftward' module 1 to which it is connected in the series-connected 'chain' of units (i.e. the unit 1A in FIG. 1). The receiving unit 1A responds by setting its internal address to "1", and sends an "AUTOADDRESS 2" command to the next module (unit 1B) in the daisy chain connection (i.e. via the cable 5 connected to its output port). Unit 1B, upon receiving the "AUTOADDRESS 2" command sets its internal address to "2", and sends an "AUTOADDRESS 3" to unit 1C. Unit 1C in turn configures the next microtile unit in the chain, and so on. In this manner, all microtile units 1 (and any input modules 9 to the left of the system control unit 7) are assigned unique ID numbers.

During the Module Identification phase, the system control unit 7 determines what modules it is connected to by requesting the modules at addresses 1, 2, 3, etc., to identify themselves. As discussed above in the Address Assignment phase, each microtile unit 1A, 1B, etc. (and any connected input module 9) is programmed to return a unique identifying code. This allows the system control unit 7 to know what is connected at address 1, address 2, address 3, etc. When a request is met with no response, the system control unit 7 will know it has reached the end of the chain.

Once all items connected to the left of the system control unit 7 have been assigned an address and have been identified, the entire self-organization process is repeated for any units (microtile units 1 and/or input modules 9) to the right of the system control unit, where the first unit to the right (i.e. unit 1F in FIG. 1) is allocated the next sequential address.

The Array Mapping phase is used to establish the spatial relationship between all of the connected microtile units 1. As briefly discussed in connection with FIG. 2, an LED 26 and photodetector 28 pair is provided along each surface of a microtile unit 1. According to one embodiment of the Array Mapping phase, the LEDs 26 on the top and left side of each individual microtile unit 1, and photodetectors 28 along the bottom and right side of each microtile unit, are paired such that the photodetectors are sensitive to the wavelengths emitted by the LEDs. The placement of LEDs 26 and photodetectors 28 is such that the top and left LEDs of one microtile unit are aligned with photodetectors on adjacent microtile units to the top and left, respectively, such that only one photodetector 28 is capable of 'seeing' any given LED 26 within the array.

The LED 26 and photodetector 28 pairs may also be used for optically communicating video and control signals between respective modules 1, 7 and 9, as an alternative to serial data cables 5.

The Array Mapping phase starts with the system control unit 7 sending a command to microtile unit 1A to turn on its top surface LED 26. The system control unit 7 then queries all other microtile units 1 see which one is capable of detecting the illuminated LED (i.e. via an associated photodetector 28). Because of the alignment of LEDs and photodetectors discussed above, only one microtile unit 1 (or none) will respond in the affirmative. The system control unit 7 then knows which microtile unit (i.e. unit 1B) is directly above unit 1A. The system control unit 7 then commands microtile unit 1A to turn off its top LED 26 and illuminate its left-surface LED 26. Another query is sent by system control unit 7 to the array of microtile units in order to reveal the address of the unit immediately to the left of microtile unit 1A. If no microtile unit responds in the affirmative, then the system control unit 7 knows that there is no unit adjacent and to the left of unit 1A, and therefore a gap or a boundary has been located in the array. System control unit 7 then proceeds to repeat the process for unit 1B. By carrying out this procedure through the entire array, system control unit 7 builds a map indicating precisely how the array is physically configured. This information is then used by the system control unit 7 to determine the portion of the image each individual microtile unit is to be responsible for, and to relay that information to each microtile unit 1.

A person skilled in the art will appreciate that the Array Mapping phase does not need to be done with LEDs and photodetectors. For example, a set of electrical contacts could also be used (especially for the grid microtile embodiment of FIG. 4), or other similar physical detection may be used to establish which units are physically adjacent to each other.

Figure 7:
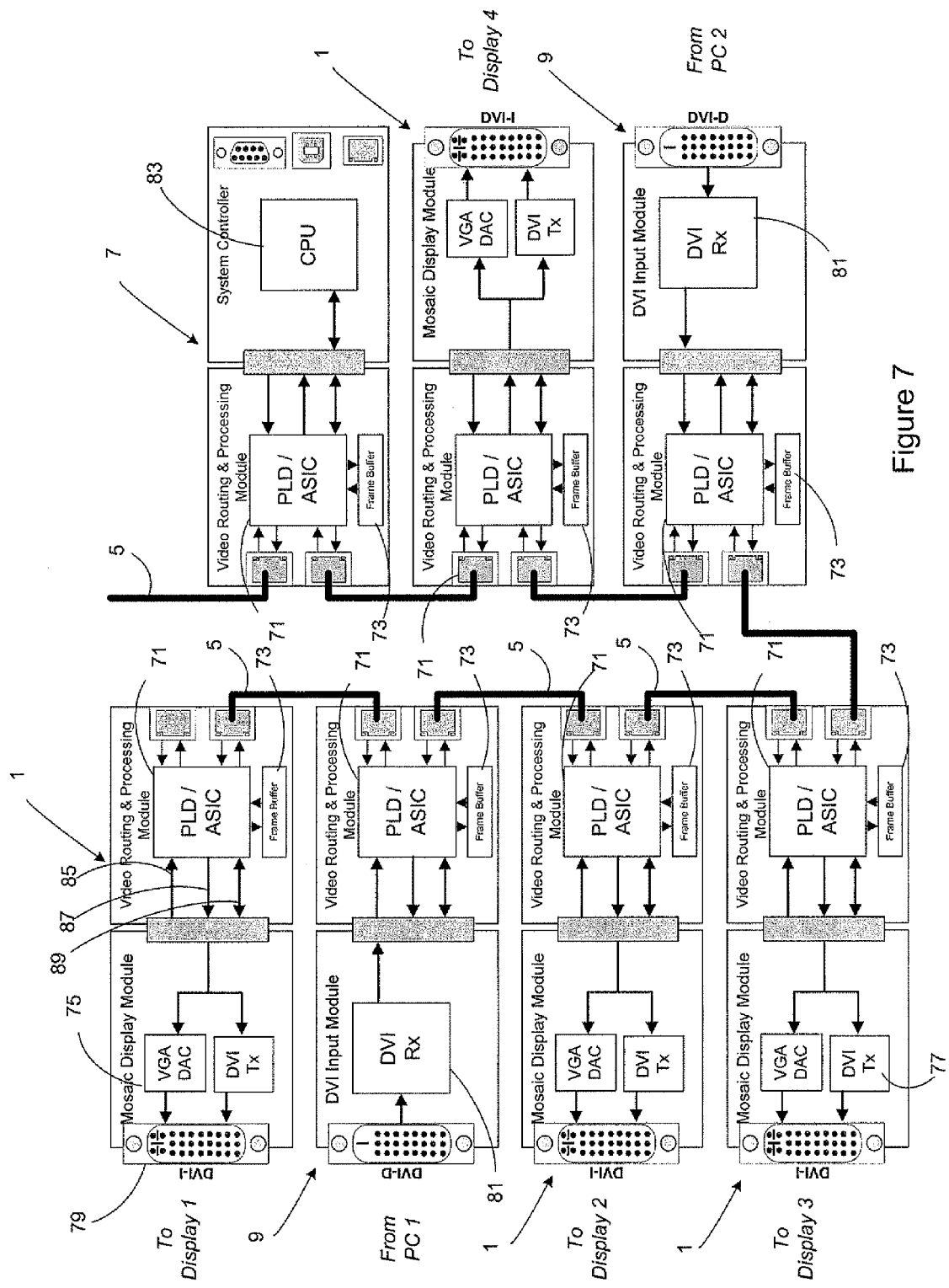
FIG. 7 is a block diagram showing an arrangement of microtile units, input modules and a system controller according to an exemplary embodiment.

Turning to FIG. 7, a block diagram is provided showing electronic components of an arrangement of microtile units 1, input modules 9 and a system controller 7 according to an exemplary embodiment. Each microtile unit 1, input module 9 and a system controller 7 incorporates a video routing and processing module comprising PLD/ASIC 71 and frame buffer 73, the details of which are set forth in FIG. 8, for receiving, transmitting and operating on video and command signals. The functional circuitry of each video routing and processing module is identical but operates on video and command signals in accordance with its 'personality' as a microtile unit 1, input module 9, or system controller 7. Thus, the video routing and processing module of each microtile unit 1 communicates with an associated mosaic display module comprising digital to analog converter (DAC) 75 and DVI transmitter 77 for transmitting video signals to an associated light engine via a DVI connector 79, Likewise, each input module 9 includes a DVI receiver 81 for receiving video signals from a source, such as a PC via a DVI connector 79, and each system controller 7 includes a CPU 83 for exchanging command/control messages with other units, via its video routing and processing module.

Video signals are input to the video routing and processing module via an input bus 85, and video signals are output therefrom via an output bus 87. CPU command signals are exchanged via a control bus 89.

Figure 8:
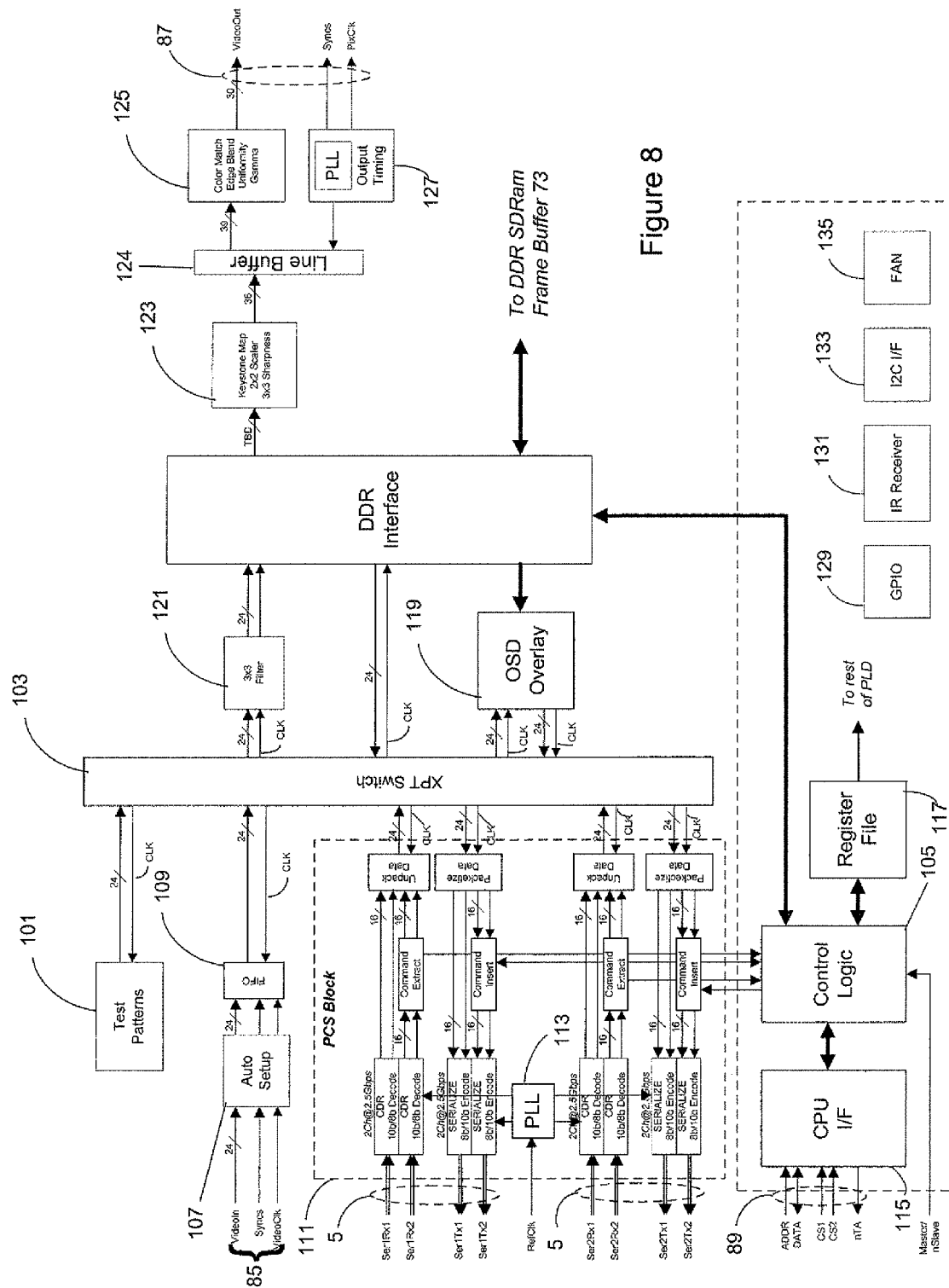
FIG. 8 is a block diagram showing internal circuitry of a video routing and processing module for an exemplary microtile unit according to the invention.

Turning to FIG. 8, details of an exemplary video routing and processing module are set forth. Test patterns block 101 is used to generate test images for testing interconnection of modules and as an aid in set up for image geometry correction, etc.

Crosspoint switch 103 functions as a multiplexer under control of control logic 105. Control logic 105 controls operation of the video routing and processing module in one of either a "master mode" or "slave mode", as discussed in greater detail below.

The auto setup block 107 receives input video signals from DVI receiver 81 via input bus 85, performs autodetection of the video format (e.g. VGA, XGA, etc.) and optimizes the video signal for display at an adjacent microtile unit 1. The video signal is loaded into a FIFO 109 for synchronizing the timing of the input video source to the internal processor clock (CLK), and output therefrom to the crosspoint switch 103. As an alternative, the functionality of auto setup block 107 may be incorporated directly into the DVI input module.

A PCS (Physical Coding Sublayer) block 111 provides an interface between the signals on cable's 5, the Crosspoint switch 103 and control logic 105. The PCS block 111 includes a pair of CDR (clock data recovery) decoder circuits and a pair of serialize encoder circuits for each serial cable 5. A PLL 113 (phase locked loop) is connected to each decode and encode circuit to provide proper synchronization of the multiple serial data streams. The lower CDR decoder circuit (Ser1Rx2 and Ser2Rx2) is, in turn, connected to a command extract block, while the lower serialize encoder circuits receives signals from a command insert block. Packetized data received from cable 5 is unpacked via an unpack data block before application to crosspoint switch 103. Conversely, signals received from crosspoint switch 103 are packetized in packetize data blocks for transmission via cable 5.

When operating in a "master mode", in which the video routing and processing module forms part of the control module 7, command data is extracted from the video blanking interval of video signals carried by cable 5 and inserted into the data stream (e.g. using 8B10B encoding) via the command extract and insert blocks, respectively, under control of CPU 83. When operating in a "slave mode", wherein the video routing and processing module forms part of microtile unit 1 or input module 9, command data embedded in the video stream (e.g. the AUTOADDRESS commands used for self-organizing and configuring of microtile units 1) are extracted and applied to control logic 105. More particularly, the packetize and unpack data blocks perform the necessary conversion between 8B10B encoded data blocks and raster scan video data signaling.

CPU interface 115 exchanges commands between control logic 105 and the CPU 83 (where the video routing and processing module forms part of the control module 7). Register file 117 stores configurations and settings for control logic 105.

An OSD (On Screen Display) module 119 for overlaying user menus generated by the CPU 83 on video data transmitted to the various microtile units 1.

A 3×3 FIR filter 121 is provided for anti-aliasing the input video signal to permit keystone correction, as is known in the art. A further FIR filter 123 performs bilinear image scaling (2×2 scalar filter), and rotation (keystone correction) based on information received from the alignment process discussed above in connection with FIGS. 6A and 6B. Frame buffer 73 stores portions of the required image and downloads the necessary filter coefficients to the filter 123. After scaling, the filter 123 performs an additional high pass filter operation on the output video signal for increased image sharpness (3×3 sharpness filter).

Filtered signals output from filter 123 are applied to a block 125 via line buffer 124, for color matching, edge blending, uniformity correction and gamma correction. For color matching, block 125 implements a 3×3 (RGB) color correction matrix based on input from the sensors discussed above in connection with FIGS. 6A and 6B to correct color differences resulting from manufacturing tolerances associated with the microtile units 1, as well as the effects of temperature and aging on the illumination light source. Edge blending is used for the "grid" microtile embodiment of FIGS. 4A, 4B and 4C, as is known in the art. Likewise, gamma correction is performed in a conventional manner.

An output timing block 127 includes a further PLL to accommodate various display types and programmable output timing.

Preferably, the module also includes a GPIO (General Purpose Input/Output) block 129 for providing a set of IO ports which can be configured for either input or output, and to support common bus protocols such as the I²C (Inter-integrated Circuit), serial computer bus 133 described in U.S. Pat. No. 4,689,740.

An IR receiver 131 is provided for remote control of the associated module 1, 7 or 9.

A fan 135 provides cooling for the module (whether a microtile unit 1, system control unit 7 or input module 9), in a well-known manner.

Although not shown, GPIO 129, IR receiver 132, and I²C interface 133 are connected to control logic 105.

A person skilled in the art, having read this description of the preferred embodiment, may conceive of variations and alternative embodiments. For example, although the embodiment of FIG. 1 includes a single source of power 7, which is distributed amongst the plurality of microtile units 1, it is contemplated that each microtile unit 1 may incorporate its own power supply, especially for small configurations of microtile units 1. Likewise, it is contemplated that, where as the illumination for the microtile units 1 discussed above is self-contained, light from one or more light sources may be distributed to multiple microtile units 1.

All such variations and alternative embodiments are believed to be within the ambit of the claims appended hereto.

What is claimed is:

1. An imaging system, comprising:
   an image source providing a video data stream; and
   a plurality of microtile units for generating respective portions of an image from said video data stream, each microtile unit including a plurality of coupling mechanisms for connection to a plurality of other microtile units such that said microtile units may be arranged in multiple geometrical configurations, and each microtile unit including circuitry for communication with said plurality of other microtile units to control generation of each respective portion of said image; and
   a system control unit for:
   automatically detecting configuration of said connected microtile units to determine the portion of the image each individual microtile unit is to be responsible for, and
   relaying respective filter information regarding each said portion to each respective microtile unit;
   wherein said circuitry in each said microtile unit further includes video processing circuitry for sub-image capture from said video data stream based on said filter information.

2. The imaging system of claim 1, wherein said circuitry further includes a plurality of signal ports for interconnection between respective microtile units via respective communication lines.

3. The imaging system of claim 2, wherein said communication lines include at least one of lines for data transmission, lines for communications, and lines for power transmission.

4. The imaging system of claim 2, wherein said system control unit is connected to an available one of said signal ports on one of said microtile units for automatically detecting which of said multiple geometrical configurations said plurality of microtile units are arranged in.

5. The imaging system of claim 4, wherein said system control unit further includes a source of power for providing power to respective ones of said microtile units.

6. The imaging system of claim 2, wherein each said microtile unit further includes detection apparatus for detecting adjacent microtile units in a self-organizing process to establish a spatial relationship between said connected microtile units, said detection apparatus separate from said plurality of signal ports.

7. The imaging system of claim 6, wherein said circuitry for communication includes circuitry for encoding and decoding control messages respectively into and out of video signals representing said image, said control messages comprising self-organizing commands in said self-organizing process causing said detection apparatus to detect said adjacent microtile units.

8. The imaging system of claim 7, wherein each of said microtile units support support hot-plugging via said control messages such that said self-organization process can be run on an as-required basis without interrupting said generating respective portions of said image.

9. The imaging system of claim 1, wherein each of said microtile units further includes a light engine for generating said respective portions of said image.

10. The imaging system of claim 1, wherein said circuitry includes a microprocessor, frame buffer and video processing to provide at least one of said sub-image capture, resizing, color matching, edge blending and geometric correction of said image.

11. The imaging system of claim 1, wherein said image source provides video processing, including at least one of de-interlacing, scaling, and frame rate conversion.

12. The imaging system of claim 1, wherein said coupling mechanisms comprise complementary shaped protrusions and indentations on respective surfaces of said microtile units to permit registration and alignment of said microtile units.

13. The imaging system of claim 1, wherein each of said microtile units includes a self-contained screen and a rear projector for projecting said portion of said image on said screen.

14. The imaging system of claim 1, wherein each microtile unit includes a projector for projecting said respective portions of said image onto a remote screen.

15. The imaging system of claim 14, wherein each of said microtile units includes circuitry for edge blending said image across adjacent ones of said plurality of microtile units.

16. The imaging system of claim 1, wherein said coupling mechanisms comprise complementary male portions and female portions.

17. The imaging system of claim 16, wherein said male portions and female portions are generally tubular and include complementary threads.

18. The imaging system of claim 1, wherein said circuitry for communication includes circuitry for encoding and decoding control messages respectively into and out of video signals representing said image.

19. The imaging system of claim 1, wherein said image source, each of said microtile units and said system control unit includes a video routing and processing module for receiving, transmitting and operating on video and command signals in accordance with its associated functionality as image source, microtile unit and system control unit respectively.

20. The imaging system of claim 1, wherein said video processing circuitry in each said microtile unit further comprises a filter, and said filter information comprises filter coefficients which are downloaded to each said filter such that said video processing circuitry in each said microtile unit can capture a respective sub-image from said video data stream.

\* \* \* \* \*